Aug. 1, 1967
E. DRYDEN
3,333,887
AUXILIARY ATTACHMENT MOUNTING MEANS FOR AN
AUXILIARY VISOR SHIELD
Filed May 24, 1965
2 Sheets-Sheet 1
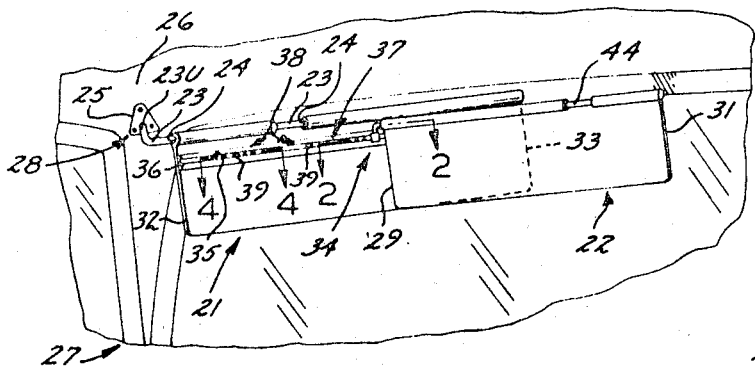
FIG. 1
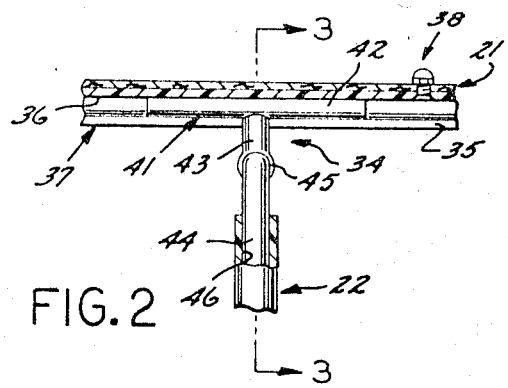
FIG. 2
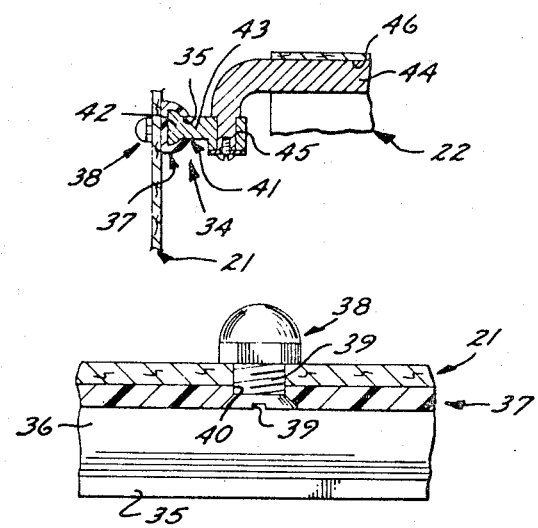
FIG. 3
FIG. 4
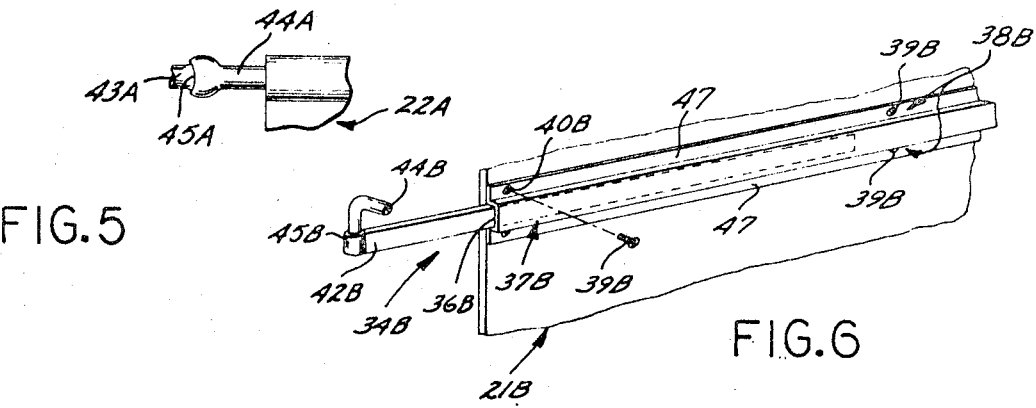
FIG. 5
FIG. 6
INVENTOR.
EVA DRYDEN

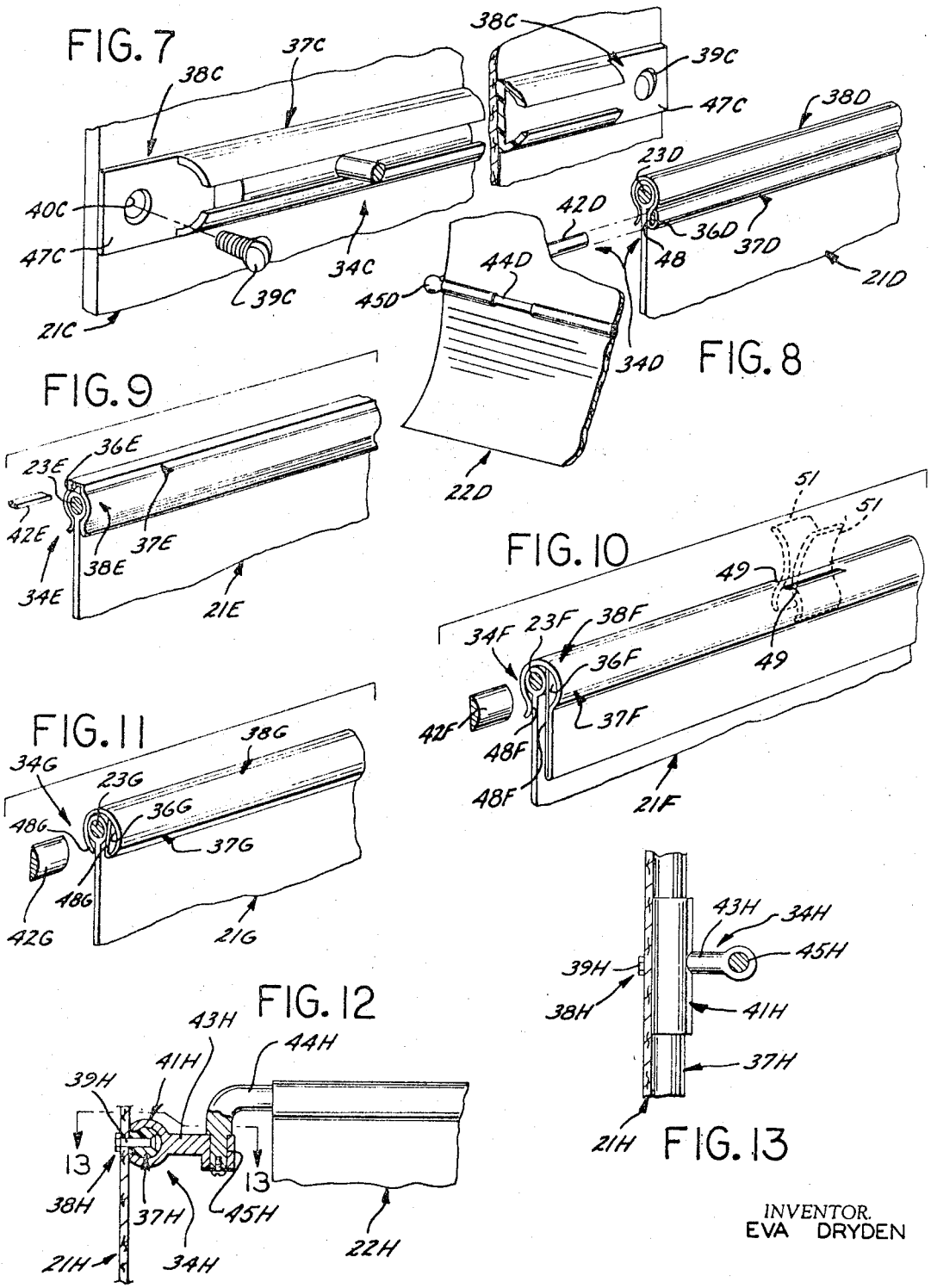

United States Patent Office 3,333,887
Patented Aug. 1, 1967

3,333,887
AUXILIARY ATTACHMENT MOUNTING MEANS
FOR AN AUXILIARY VISOR SHIELD
Eva Dryden, 6137 Morella Ave.,
North Hollywood, Calif. 91606
Filed May 24, 1965, Ser. No. 458,175
9 Claims. (Cl. 296—97)

ABSTRACT OF THE DISCLOSURE

The specification discloses an auxiliary sun visor or shield and attachment or mounting means for connecting it to a pre-existing sun visor in a motor vehicle in a manner such that the auxiliary sun visor or shield can be longitudinally slidably adjusted along the length of the pre-existing automobile sun visor in addition to being capable of pivotal adjustment, thus making it possible to position the auxiliary sun visor or shield, with respect to the eyes of a driver of the automobile, in a manner such as to effectively shield them from glare under virtually any type of glare-producing driving conditions. The important feature of the disclosure is the removable attachment means for mounting the auxiliary sun visor on a pre-existing motor vehicle sun visor in a manner permitting the types of adjusting movements mentioned above.

---

This application is a continuation-in-part of application Ser. No. 280,998, filed May 16, 1963, now abandoned.

The present invention relates generally to sun visor means for a vehicle such as an automobile or the like, although not specifically so limited. More particularly, the present invention relates to an auxiliary attachment mounting means for positionally adjustably mounting an auxiliary sun visor shield or glare shield with respect to a main sun visor or glare shield which is normally mounted in a conventional manner with respect to the vehicle.

In other words, the present invention relates primarily to the means for mounting an auxiliary sun visor or glare shield with respect to the pre-existing main sun visor or glare shield normally initially supplied with a vehicle such as an automobile or the like.

The novel positionally adjustable attachment mounting means of the present invention provides an arrangement such that a auxiliary glare shield can be effectively mounted in a horizontally slidingly positionally adjustable or changeable manner such as to effectively shield the eyes of a driver of an automobile, or the like, under virtually any type of glare conditions.

It is an object of the present invention to provide an improved auxiliary glare shield attachment apparatus for controllably positionally mounting an auxiliary glare shield with respect to a main glare shield in a manner such that the auxilary glare shield will be horizontally positionally slidingly adjustable or changeable with respect to the main glare shield whereby to provide virtually any desired type and/or combination of glare-shielding effects desired.

It is a further object of the present invention to provide improved attachment apparatus of the type referred to above which is of extremely simple, inexpensive, foolproof, easy-to-attach construction with respect to pre-existing main glare shields, such as to be conducive to widespread use thereof.

Further objects are implicit in the detailed description which follows hereinafter (which is to be construed as exemplary of, but not specifically limiting the invention) and will be apparent to persons skilled in the art after a careful study thereof.

For the purpose of clarifying the nature of the present invention, several exemplary embodiments are illustrated in the hereinbelow-described figures of the accompanying two sheets of drawings and are described in detail hereinafter.

FIG. 1 is a fragmentary, partially broken away, perspective view, illustrating one exemplary embodiment of the present invention in attached operative relationship with respect to a pre-existing main glare shield, comprising the sun visor means of an automobile (shown fragmentarily), and also in mounting relationship wit hrespect to an auxiliary glare shield whereby to provide the adjustment features referred to hereinbefore in broad terms and hereinafter in detail.

FIG. 2 is an enlarged fragmentary and partially broken away, staggered plane, sectional view, taken in the direction of the arrows 2—2 of FIG. 1.

FIG. 3 is a fragmentary sectional view, taken in the direction of the arrows 3—3 of FIG. 2.

FIG. 4 is a fragmentary sectional view, taken in the direction of the arrows 4—4 of FIG. 1 and typically illustrates one type of attachment means for attaching the apparatus of the present invention to the main glare shield.

FIG. 5 is a fragmentary, partially broken away, elevational view, taken from the same aspect as FIG. 3 but illustrates a modified type of pivotal connection means effectively comprising universal joint hinge means.

FIG. 6 is a fragmentary perspective view of a slightly modified form of the apparatus wherein the longitudinal junction means and slidable engagement means are of a different type from that shown in FIGS. 1–4.

FIG. 7 illustrates, in fragmentary, partially broken away form, a further modification of the longitudinal junction means wherein the attachment means or portions carried thereby are modified from those illustrated in the earlier figures.

FIG. 8 illustrates in fragmentary, partially broken away, extended, perspective form, another modification of the invention wherein the attachment measn for the longitudinal junction means is of a removable spring clip type adapted to slip over the edge of the main pre-existing glare shield and wherein the effective pivotal connection thereof with respect to the auxiliary glare shield is not along the top edge thereof in the manner of the first form of the invention illustrated in FIGS. 1–4, but is at a lower location with respect to said auxiliary glare shield.

FIG. 9 is a fragmentary exploded perspective view illustrating another modified type of longitudinal junction means (and attachment means) and slidable engagement means cooperable therewith (shown fragmentarily and exploded).

FIG. 10 illustrates, in fragmentary perspective form, a further modification of the longitudinal junction means and the attachment means thereof. Also, the slidable engagement means cooperable with said longitudinal junction means is illustrated in FIG. 10 in fragmentary exploded form. This view also illustrates in phantom the provision of spreader members cooperable with cutouts for use in spreading the resilient spring clip type attachment means when the device is to be attached to an edge portion of a main sun visor glare shield or is to be removed therefrom.

FIG. 11 illustrates in fragmentary perspective form a further modification of the longitudinal junction means and the attachment means thereof. Also, the slidable engagement means cooperable with said longitudinal junction means is illustrated in FIG. 11 in fragmentary exploded form.

FIG. 12 is a fragmentary view, partly in section and partly in elevation, illustrating another type of adjustable mounting means.

FIG. 13 is a top view of FIG. 12 taken in the direction of the arrows 13—13 of FIG. 12.

Referring to FIGS. 1–4 for exemplary purposes, one illustrative, but non-specifically limiting, embodiment of the invention is shown in attached relationship with respect to a first or main glare shield, indicated generally at 21, and in controllably positionally adjustable mounting relationship with respect to a second or auxiliary glare shield, indicated generally at 22.

In said exemplary first form of the apparatus, each of said glare shields 21 and 22 is shown in an exemplary form wherein it is of substantially flat, substantially rectangular shape having rounded lower corners. However, it should be clearly noted that the precise configuration, structure, and the material of each of said glare shields 21 and 22 is not specifically limited to the showing of said exemplary first form of the apparatus, but may take a variety of other and different shapes or constructions, and may be made of any suitable material.

The main glare shield 21 is adapted to be provided with means for effectively and adjustably mounting it at a desired location, which is usually adjacent to the front windshield and the side window of an automobile, although not specifically so limited.

In said exemplary first form of the apparatus, said means for mounting the first or main glare shield 21 in said adjustable manner is shown as comprising a support arm 23 and an aperture-defining means 24 carried by said main glare shield 21 and receiving the support are 23 therein.

Also, in said exemplary first form of the apparatus, the outwardly projecting end of the support arm 23 is directed upwardly, as indicated at 23U, and is adapted to be fastened by the mounting bracket means, indicated at 25, at any desired location such as, for example, in said exemplary first form of the apparatus, the front upper inside corner portion 26 of an automobile body, indicated generally in fragmentary form at 27.

In said exemplary form of the apparatus, the mounting means for mounting the main glare shield 21 with respect to the automobile 27 is generally designated by the reference numeral 28 and effectively mounts said first or main glare shield 21 for arcuate pivotal movement around the axis of the upwardly extended portion 23U of the support arm whereby it can be adjusted into any desired position around said axis. However, it should be clearly noted that said mounting arrangement 28 is exemplary only and is not intended to specifically limit the invention in any manner whatsoever.

Indeed, the present invention primarily lies in the controllably attachable and controllably positionally adjustable mounting means which mounts the auxiliary glare shield 22 with respect to the main glare shield 21, which will be described in greater detail hereinafter. Actually, said mounting means 28 for mounting the main glare shield 21 with respect to the automobile 27 may include a universal joint connection rather than the type of pivotal connection about a substantially vertical axis, indicated in FIG. 1, or may comprise any type of mounting means whatsoever.

Also, in said exemplary first form of the apparatus, the mounting arrangement 28 described above effectively mounts the first or main glare shield 21 for rotation around the longitudinal axis of the support rod 23 (which may be substantially horizontal or which may be angularly displaced from a true horizontal direction in certain instances). This latter feature may be accomplished by reason of the fact that, in said exemplary first form of the apparatus, the supporting rod 23 is of round cross-sectional configuration and the aperture-defining portion 24 carried by the first or main glare shield 21 is similarly of round cross-sectional configuration and of a size and structure such as to frictionally grip the support rod 23 whereby to remain in adjusted position until manually readjusted. This frictional positional retention feature, in said exemplary first form of the apparatus, is also true of the rotative engagement of the upwardly directed portion 23U with respect to the mounting bracket means 25, which may be of any conventional type of construction. However, as pointed out above, it should be clearly noted that the above-mentioned frictional positional retention feature, both with respect to the support rod 23 and aperture-defining means 24 and also with respect to the upwardly directed portion 23U and the mounting bracket means 25 and the configurations of said elements, are exemplary only and are not to be construed as in any manner specifically limiting the present invention for the reasons detailed above.

In view of the above, no further detail of the interior features of the mounting bracket means 25 is thought necessary.

The previously mentioned second or auxiliary glare shield, indicated generally at 22, has what might be termed a first end 29 and a second end 31 longitudinally spaced therefrom and generally similar to corresponding first and second ends 32 and 33 of the first or main glare shield 21.

It should be noted that either or both of said first and/or second glare shields 21 and 22 may be of opaque or partially light-transmissive material in various different forms of the apparatus whereby to provide any desired type of glare-shielding effect.

Said exemplary first form of the apparatus also includes adjustable auxiliary glare shield mounting attachment means for positionally adjustably mounting said second or auxiliary glare shield 22 with respect to said first or main glare shield 21 by controllable attachment to said main glare shield 21, which pre-exists and is normally mounted in the automobile 27 prior to said attachment of said auxiliary glare shield mounting means thereto.

In said exemplary first form of the invention, said adjustable auxiliary glare shield mounting attachment means is of a type arranged to provide for controllably positionable adjustment of said second or auxiliary glare shield 22 with respect to said first or main glare shield 21 along a longitudinal junction line extending along the length of the first or main glare shield 21.

In said exemplary first form of the invention, the above-mentioned adjustable mounting attachment means is designated generally by the reference numeral 34 and the longitudinal junction line referred to above is indicated by the reference numeral 35 and actually comprises a longitudinal slot in a longitudinal aperture-defining portion 36 effectively comprising longitudinal junction means, indicated generally at 37, which is controllably attached to the first or main glare shield 21 by attachment means or portions, indicated generally at 38, and, in said exemplary first form of the invention, comprising threaded fastener means 39 extending through aperture means 40 in the back wall of the casing comprising the longitudinal aperture-defining junction means or portion 37, said threaded fastener means 39 extending through said apertures 40 and through corresponding apertures in the main glare shield 21 and being firmly fastened at the back end thereof whereby to firmly attach the entire auxiliary glare shield adjustable mounting attachment means 34 to the main glare shield 21 at any desired location along the length of the main glare shield 21 between opposite ends 32 and 33 thereof.

In said exemplary first form of the apparatus, said longitudinal aperture-defining junction means or portion 37 is shown as lying immediately below the longitudinal aperture-defining portion 24. However, this is exemplary only and the invention is not limited to this specific arrangement. Actually, either of said aperture-defining portions may be differently positioned and/or located with respect to the first or main glare shield 21 and/or with respect to each other.

However, the one which we are primarily concerned with is the longitudinal junction-defining means 37 of the auxiliary glare shield attachment means 34 which can, obviously, be attached by the fastening means 38 to the main glare shield 21 at any desired location and at any time. In other words, it is possible to buy the auxiliary glare shield attachment means 34 and to then attach it to a pre-existing entirely conventional main glare shield 21 in the manner indicated in FIG. 1 or in any other desired manner so that the auxiliary glare shield 22 will be longitudinally and rotatively controllably positionally adjustably mounted with respect to said main glare shield 21.

In said exemplary first form of the invention, said auxiliary glare shield adjustable mounting attachment means 34 includes slidable engagement means, such as designated by the reference numeral 41 adapted to be mounted in slidable engagement with the longitudinal junction means, indicated generally at 37, and comprising the aperture-defining portion 36 and the slot 35. This provides an arrangement such that the slidable engagement means 41 can be slidably moved along the length of the slot 35 and the aperture-defining portion 36 for positioning at any desired location along the length of said longitudinal junction means 37 and, therefore, along the length of said first or main glare shield 21 to which the entire auxiliary glare shield adjustable mounting attachment means 34 has been controllably attached by the attachment and/or fastening means 38. It should be noted that the engagement of the slidable engagement means 41 and the longitudinal junction means 37 is preferably of a frictional type such as to frictionally retain said elements in any desired position until manual readjustment thereof.

It should also be noted that, in said exemplary first form of the invention, the slidable engagement means 41 includes a member 42 which is shown in this exemplary form of the invention as being of non-round, substantially semicylindrical, cross-sectional configuration corresponding to the shape of the aperture defined by the aperture-defining means 36 of the longitudinal junction means 37, which slidably receives same therein.

In general, it can be said that in all forms of the invention irrespective of the type of slidable engagement means and longitudinal junction means functionally equivalent to the structures indicated at 41 and 37, means is provided for preventing undesired relative rotation thereof around a longitudinal axis coincident with said longitudinal junction means 37. It so happens that, in said exemplary first form of the invention illustrated, this is doubly provided by reason of the non-round configuration of the slidable insert member 42 and the similarly shaped aperture-defining portion 36 of the longitudinal junction means 37 which will not allow the projecting arm or coupling portion 43 carried by the slidable insert member 42 and extending outwardly through the slot 35 to rotate around the longitudinal axis of the longitudinal aperture-defining portion 36. Each of these arrangements acts to prevent the projecting coupling arm or portion 43 from vertical movement which would tend to allow the auxiliary glare shield 22 to, otherwise, drop downwardly into a depending position with respect to the main glare shield 21, under the action of gravity.

In said exemplary first form of the invention, the projecting coupling arm or portion 43 is effectively provided with an extension arm or longitudinal support member or rod, as indicated at 44, which is effectively pivotally attached thereto as indicated at 45, and which is adapted to support the second or auxiliary glare shield 22.

In the specific form of the apparatus illustrated in FIGS. 1–4, this is provided by means of an aperture-defining portion 46 carried by said second or auxiliary glare shield 22 and receiving said support rod 44 therein.

It should be additionally noted that in said exemplary first form of the apparatus, the engagement of the second or auxiliary glare shield 22 with respect to the support rod or arm 44 is of a rotative and longitudinally slidably extendable nature by reason of the round cross-sectional configuration of the support rod 44 and the corresponding mating round cross-sectional configuration of the aperture-defining portion 46—the engagement therebetween being tight enough to provide for effective frictional retention of position of said second or auxiliary glare shield 22 in any adjusted position until manually readjusted. However, it should be clearly noted at this point that the support arm 44 in the aperture-defining portion 46 may be positioned at any desired location with respect to the second or auxiliary glare shield 22, the first or main glare shield 21, and/or either of the aperture-defining portions 24 and/or 36 carried by said first or main glare shield 21. In other words, the invention is not limited to the arrangement shown in FIGS. 1–4 wherein the aperture-defining portion 24 is positioned at the top of the first or main glare shield 21, and the aperture-defining portion 36 of the auxiliary glare shield mounting attachment means 34 is positioned immediately therebelow, and the aperture-defining portion 46 of the second or auxiliary glare shield 22 is positioned at the top thereof. Any desired positional rearrangement of these elements may be provided in various different specific embodiments of the apparatus.

It will be noted that the exemplary first form of the apparatus described above in detail in connection with the first form of the invention primarily illustrated at 34 in FIGS. 1–4, provides an arrangement which allows controllable adjustment and/or selective positioning of both of the glare shields in a great variety of different ways such as to provide any desired type of glare protection for the driver of a vehicle or other persons subjected to glare, and it makes this possible by reason of the adjustable auxiliary glare shield mounting attachment means, indicated generally at 34, which can mount an auxiliary glare shield as shown at 22 with respect to a pre-existing and pre-mounted main glare shield such as is indicated at 21.

FIG. 5 illustrates a slight modification of the pivotal mounting arrangement indicated by the reference numeral 45 in the first form of the invention and indicated by the reference numeral 45A in this modified form of the invention wherein it comprises a frictional universal hinge joint type of connection allowing frictional pivotal readjustment of the auxiliary glare shield 22a in virtually any desired direction. This frictional universal hinge joint type connection may be employed in any of the various forms of the invention. However, it is particularly advantageous in a hereinafter-described form of the invention, as exemplified by FIG. 8, wherein the projecting support rod or arm carrying the auxiliary glare shield may be effectively non-rotatably engaged therewith in any of a variety of different ways. Where such an arrangement exists, the frictional universal hinge joint type of connection, as shown in FIG. 5, is particularly advantageous since it will allow rotation of the auxiliary glare shield about a longitudinal axis coincident with its support rod even though the support rod is non-rotatably engaged with respect to teh auxiliary glare shield. However, the frictional universal hinge joint type of connection is not in any way specifically limited to use in such an arrangement since it may be advantageously employed, under various circumstances, in various forms of the invention. The various parts of this modification which correspond to those previously described are indicated by similar reference numerals, followed by the letter A, however.

FIG. 6 is a fragmentary, partly broken away, and somewhat diagrammatic perspective view primarily illustrating a slightly modified form of the adjustable mounting attachment means of the invention similar to the corresponding structure shown at 34 in the first form of the invention and designated by the reference numeral 34B in this modification. The main difference of this modification from the first form described hereinbefore is the fact that the longitudinal junction means 37B and also the slidable insert member 42B are differently shaped from the corresponding elements of said first form of the invention.

Also, the attachment means, indicated at 38B, are slightly modified.

In the modification of FIG. 6, the longitudinal aperture-defiining portion 36B is of non-round shape like the first form of the invention but is of a different type of non-round shape, being primarily rectangular in cross-sectional configuration rather than semicircular. This is also true of the cross-sectional shape of the slidable insert member 42B which, furthermore, in this modification of the invention is longer than the corresponding element 42 of the first form of the invention and which enters the longitudinal aperture-defining portion 36B at either end thereof as determined by a user of the apparatus. In other words, this modification does not have a longitudinal slot corresponding to the slot shown at 35 in the first form of the invention, and the insert member 42B must slide with respect to the longitudinal aperture-defining portion 36B by way of entry thereinto from either end thereof.

Also, in this modification, the fastening or attachment means 38B includes an upper and lower outwardly directed fastening flange or lip 47 having a plurality of holes such as the one shown at 40B adapted to carry the threaded fastener means 39B for fastening attachment to the main glare shield 21B in a manner similar to that described hereinbefore. Other parts of this modification of the invention which correspond to those previously described are indicated by similar reference numerals, followed by the letter B, however.

FIG. 7 is a fragmentary view of aspect generally similar to FIG. 6, but illustrates a further slight modification of the invention which is substantially identical to the first form of the invention except for the fact that the fastening means 38C includes end flange portions 47C having the holes 40C therethrough and adapted to receive the fastening screw means 39C for fastening the modified longitudinal junction means 37C to the main glare shield 21C in a manner similar to that described hereinbefore. This form of the invention is adapted to receive an insert member substantially identical to that of the first form of the present invention as indicated by the reference numeral 42 thereof. Other parts of this modification of the invention which correspond to those previously described are indicated by similar reference numerals, followed by the letter C, however.

FIG. 8 is another view generally similar to FIGS. 6 and 7, and illustrates a further modification of the adjustable mounting attachment means, which is designated by the reference numeral 34D, wherein the longitudinal junction means, designated generally at 37D, is provided with a different type of fastening means, indicated generally at 38D, which effectively comprises a resilient spring clip type of controllably engageable and disengageable fastener means having resiliently separable opposed portions 48 which are adapted to be forcibly resiliently slipped over the top edge of the main glare shield 21D whereby to become firmly but controllably removably engaged and effectively attached with respect thereto.

In the modification of FIG. 8, the longitudinal aperture-defining portion 36D is of non-round shape but of a different type of non-round shape than that illustrated in the preceding forms of the invention, being in the form of a substantially elliptical or oval cross-sectional shape. This is also true of the longitudinal insert member 42D which is generally similar to the form thereof shown at 42B in the modification of the invention shown in FIG. 6 in that it is adapted to be entered into the longitudinal aperture-defining portion 36D from either end thereof rather than by way of a front slot of the type shown at 35 in the first form of the invention.

Also in this modification of the invention, the projecting arm 44D is shown as being received by the auxiliary glare shield 22D at a position between the top and bottom edges thereof rather than along the top edge thereof as previously described, and is shown as being of a non-round cross-sectional shape (which is also true of the aperture-defining portion 46D) which, in this exemplary form, is illustrated as being substantially oval or elliptical, although not specifically so limited. However, both the position thereof and the cross-sectional configuration thereof can be modified as desired and may be similar to the disclosures of any of the other forms of the invention illustrated or to other substantial functional equivalents thereof. In the specific arrangement shown in FIG. 8, and primarily by reason of the non-rotative engagement of the projecting non-round arm 44D with respect to the similarly shaped aperture-defining portion 46D carried by the auxiliary glare shield 22D, a universal hinge joint type of pivotal connection means interconnects the two elements 42D and 44D as indicated at 45D, and is of essentially the same type as that illustrated at 45A in FIG. 5. This makes it possible to rotate the auxiliary glare shield 22D around the longitudinal axis of the non-round support arm 44D in a manner functionally equivalent to that of the first form of the invention described hereinbefore and illustrated in FIGS. 1-4. However, various other pivotal connection means may be employed in certain other versions of this form of the invention. Other parts of this modification of the invention which correspond to those previously described are indicated by similar reference numerals, followed by the letter D, however.

FIG. 9 is another view generally similar to FIG. 8 but illustrating a further slight modification thereof, primarily with respect to the attachment means for attaching the modified longitudinal junction means, indicated generally at 37E, with respect to the edge of the main glare shield 21E. In this modification it will be noted that the resilient spring clip indicated generally at 38E carries the longitudinal aperture-defining portion 36E at the top thereof and in a non-round shape which is substantially rectangular for the longitudinal sliding end reception of a similarly shaped substantially rectangular longitudinal insert member 42E in a manner similar to that shown at 42B in FIG. 6. Otherwise, this modification is quite similar to the form illustrated in FIG. 8 and other parts of this modification which correspond to those previously described are indicated by similar reference numerals, followed by the letter E, however.

FIG. 10 is a further modification generally similar to FIG. 9 and merely illustrates a slightly modified form of construction thereof wherein the modified longitudinal junction means, which is indicated generally at 37F, is formed so as to have the same general type of spring clip fastening means, indicated generally at 38F, as that shown at 38E in FIG. 9 but wherein the longitudinal aperture-defining portion 36F is frontally positioned and is shaped somewhat in the form of a semicircular configuration rather than being top positioned and in the form of a generally rectangular configuration in the manner of FIG. 9. Therefore, this modified longitudinal aperture-defining means 36F is adapted to receive at either end thereof a longitudinal insert member 42F of a length generally similar to that shown at 42B in FIG. 6 but of a cross-sectional configuration similar to the insert member 42 of the first form of the invention illustrated in FIGS. 1–4.

Additionally, this modification includes spreader bar cut-out aperture means 49 cooperable for the removable reception of a pair of finger-operable spreader bar means, such as shown in phantom at 51, which can then be forcibly digitally moved toward each other for effectively forcing the spaced opposed separable portions 48F of the spring clip type of fastening means 38F apart for allowing same to be slipped over the top edge (or any other edge, as desired) of the main glare shield 21F for firmly mounting the entire device thereon. Said spreader bar means 51 and cut-out means 49 may also be employed if the device is to be removed from said main glare shield. Other parts of this modification which correspond to those previously described are indicated by similar reference numerals, followed by the letter F, however.

FIG. 11 is a view very similar to FIG. 10 and merely illustrates, in fragmentary form, a slightly different construction thereof wherein the longitudinal aperture-defining portion, which is indicated at 36G, actually in effect comprises one of the spaced separable resilient engagement elements 48G of the resilient spring clip type of fastening means indicated generally at 38G. Otherwise, this modification is substantially identical to that shown in FIG. 10 and various parts of this modification which correspond to those previously described are indicated by similar reference numerals, followed by the letter G, however.

FIGS. 12 and 13 illustrate a slight modification of the adjustable mounting means, which is indicated generally at 34H, wherein the two relatively slidable elements comprising the first and second portions of said positionally adjustable mounting means are in effect reversed—that is, the longitudinally apertured portion is connected to the auxiliary glare shield, indicated generally at 22H, while the relatively slidable insert member is connected with respect to the main glare shield indicated generally at 21H. In other words, in this modification, said adjustable mounting means 34H comprises the encompassing track follower means 41H which is relatively slidably positionally positioned on and carried by longitudinal outwardly projecting track means 37H for relative longitudinal sliding movement in a manner functionally similiar to that described in detail hereinbefore with respect to the first form of the invention.

In the modification of FIGS. 12 and 13, the longitudinal track means 37H, which in effect comprises a modified form of the hereinbefore-described longitudinal junction means, is provided with fastening means 38H of the threaded fastener type 39H generally similar to those designated at 39 in the first form of the invention and adapted for use in controllably fastening said longitudinal junction means 37H with respect to the main preexisting glare shield 21H along the length thereof at any desired location with respect thereto for the purposes of the present invention. Other parts of this modification of the invention which correspond to those previously described are indicated by similar reference numerals, followed by the letter H, however.

It should be noted that all of the various forms of the present invention describe attachment structures which can be purchased or acquired and then mounted with respect to a premanufactured first or main glare shield already carried by a motor vehicle. This is an important feature of the present invention.

It should be noted that, while the various different glare shields illustrated in the figures of the drawings are shown as being made of a single thickness of fiber or fibrous material, it should be clearly noted that this is for exemplary purposes only and is not to be construed as specifically limiting the invention in any way. This is particularly true since the invention is not directed to the glare shields, per se, but rather to the auxiliary glare shield mounting attachment means, as indicated generally in the first form of the invention by the reference numeral 34 and as indicated in the various other illustrations of the other forms of the invention by a corresponding reference numeral, followed by different alphabetical letters corresponding to the particular modification. Actually, the glare shields normally are manufactured with surface coatings (which are not shown in the drawings for reasons of drawing simplification). Furthermore, in certain preferred forms of the invention, they may be made of plastic material of either an opaque or partially light-transmissive type, as desired, or they may be made of any other suitable material.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantial equivalent construction embodying the basic teachings and inventive concept of the present invention.

I claim:

1. Auxiliary attachment mounting means for positionally adjustably mounting an auxiliary sun visor shield with respect to a main sun visor shield, comprising: longitudinal positionally adjustable auxiliary glare shield mounting means including first and second portions, said first portion comprising longitudinal junction means provided with controllably engageable and disengageable attachment means cooperable for attachment thereof to a main glare shield along the length thereof, said second portion including slidable engagement means normally in slidable engagement with said longitudinal junction means and provided with effective pivotal connection means and support means cooperable for mounting engagement with respect to an auxiliary glare shield in a manner for supporting it in outwardly projecting relationship with respect to said main glare shield, said slidable engagement means and said longitudinal junction means slidably engaged therewith including means for preventing relative rotation thereof around a longitudinal axis substantially coincident with said longitudinal junction means, one of said first and second portions of said adjustable mounting means comprising a longitudinal aperture-defining means, and the other of said portions of said adjustable mounting means comprising a projecting insert member normally relatively slidably positioned within said aperture-defining means for relative longitudinal sliding movement.

2. Apparatus as defined in claim 1, wherein said engageable and disengageable attachment means comprises a plurality of attachment apertures transversely cooperable with threaded fastener means in a direction substantially transverse with respect to the surface of the main glare shield to which said first portion of said adjustable mounting means comprising said longitudinal junction means is to be removably attached.

3. Auxiliary attachment mounting means for positionally adjustably mounting an auxiliary sun visor shield with respect to a main sun visor shield, comprising: longitudinal positionally adjustable auxiliary glare shield mounting means including first and second portions, said first portion comprising longitudinal junction means provided with controllably engageable and disengageable attachment means cooperable for attachment thereof to a main glare shield along the length thereof, said second portion including slidable engagement means normally in slidable engagement with said longitudinal junction means and provided with effective pivotal connection means and support means cooperable for mounting engagement with respect to an auxiliary glare shield in a manner for supporting it in outwardly projecting relationship with respect to said main glare shield, said slidable engagement means and said longitudinal junction means slidably engaged therewith including means for preventing relative rotation thereof around a longitudinal axis substantially coincident with said longitudinal junction means, one of said first and second portions of said adjustable mounting means comprising a longitudinal aperture-defining means, and the other of said portions of said adjustable mounting means comprising a projecting insert member normally relatively slidably positioned within said aperture-defining means for relative longitudinal sliding movement; said controllably engageable and disengageable attachment means comprising resilient spring clip engagement means carrying said first portion of said adjustable mounting means comprising said longitudinal junction means, said resilient spring clip engagement means including forcibly separable opposed portions adapted to be forcibly slipped over the edge of said main glare shield for resilient gripping and attaching engagement with respect to opposite surface portions thereof.

4. Attachment apparatus as defined in claim 3, wherein said means for preventing relative rotation of said slidable engagement means and said longitudinal junction means comprises non-round aperture means defined by and within said longitudinal aperture-defining means and a longitudinally relatively slidably cooperable and similarly non-round portion provided on said projecting insert member.

5. Attachment apparatus as defined in claim 3, wherein said longitudinal junction means effectively comprises and defines said projecting insert member, wherein said slidable engagement means effectively comprises and defines said longitudinal aperture-defining means, and wherein said means for preventing relative rotation of said slidable engagement means and said longitudinal junction means comprises non-round longitudinal outwardly projecting track means defined by said projecting insert member comprising said longitudinal junction means and a longitudinally relatively slidably cooperable and similarly non-round encompassing track follower means defined by said longitudinal aperture-defining means comprising said slidable engagement means.

6. Auxiliary attachment mounting means for positionally adjustably mounting an auxiliary sun visor shield with respect to a main sun visor shield, comprising: longitudinal positionally adjustable auxiliary glare shield mounting means including first and second portions, said first portion comprising longitudinal junction means provided with controllably engageable and disengageable attachment means cooperable for attachment thereof to a main glare shield along the length thereof, said second portion including slidable engagement means normally in slidable engagement with said longitudinal junction means and provided with effective pivotal connection means and support means cooperable for mounting engagement with respect to an auxiliary glare shield in a manner for supporting it in outwardly projecting relationship with respect to said main glare shield, said slidable engagement means and said longitudinal junction means slidably engaged therewith including means for preventing relative rotation thereof around a longitudinal axis substantially coincident with said longitudinal junction means, one of said first and second portions of said adjustable mounting means comprising a longitudinal aperture-defining means, and the other of said portions of said adjustable mounting means comprising a projecting insert member normally relatively slidably positioned within said aperture-defining means for relative longitudinal sliding movement; said controllably engageable and disengageable attachment means comprising resilient spring clip engagement means integrally carrying and defining said first portion of said adjustable mounting means comprising said longitudinal junction means, said resilient spring clip engagement means including forcibly separable opposed portions adapted to be forcibly slipped over the edge of said main glare shield for resilient gripping and attaching engagement with respect to opposite surface portions thereof.

7. Auxiliary attachment mounting means for positionally adjustably mounting an auxiliary sun visor shield with respect to a main sun visor shield, comprising: longitudinal positionally adjustable auxiliary glare shield mounting means including first and second portions, said first portion comprising longitudinal junction means provided with controllably engageable and disengageable attachment means cooperable for attachment thereof to a main glare shield along the length thereof, said second portion including slidable engagement means normally in slidable engagement with said longitudinal junction means and provided with effective pivotal connection means and support means cooperable for mounting engagement with respect to an auxiliary glare shield in a manner for supporting it in outwardly projecting relationship with respect to said main glare shield, said slidable engagement means and said longitudinal junction means slidably engaged therewith including means for preventing relative rotation thereof around a longitudinal axis substantially coincident with said longitudinal junction means, one of said first and second portions of said adjustable mounting means comprising a longitudinal aperture-defining means, and the other of said portions of said adjustable mounting means comprising a projecting insert member normally relatively slidably positioned within said aperture-defining means for relative longitudinal sliding movement; said controllably engageable and disengageable attachment means comprising resilient spring clip engagement means carrying said first portion of said adjustable mounting means comprising said lonigtudinal junction means, said resilient spring clip engagement means including forcibly separable opposed portions adapted to be forcibly slipped over the edge of said main glare shield for resilient gripping and attaching engagement with respect to opposite surface portions thereof, said resilient spring clip engagement means being provided with spreader bar cut-out aperture means cooperable for the reception of finger-operable spreader bar means for forcible manual opening of said resiliently separable opposed portions of said resilient spring clip engagement means during attachment and detachment thereof with respect to said main glare shield.

8. Auxiliary mounting attachment means adapted to be attached to a main glare shield of a vehicle sun visor means and adapted to positionally adjustably mount an auxiliary glare shield for controllably positionable adjustment with respect to said main glare shield, comprising: longitudinal positionally adjustable auxiliary glare shield mounting means including first and second portions, said first portion comprising longitudinal junction means provided with controllably engageable and disengageable attachment means cooperable for attachment thereof to a main glare shield along the length thereof, said second portion including slidable engagement means normally in slidable engagement with said longitudinal junction means and provided with effective pivotal connection means and support means cooperable for mounting engagement with respect to an auxiliary glare shield in a manner for supporting it in outwardly projecting relationship with respect to said main glare shield, said slidable engagement means and said longitudinal junction means slidably engaged therewith including means for prventing relative rotation thereof around a longitudinal axis substantially coincident with said longitudinal junction means, one of said first and second portions of said adjustable mounting means comprising a longitudinally slotted longitudinal aperture-defining casing means having a longitudinal slot facing outwardly and lying in a plane having a component substantially normal to the surface of said main glare shield, and the other of said portions of said adjustable mounting means comprising a projecting insert member normally relatively slidably positioned within said slotted aperture-defining means for relative longitudinal sliding movement.

9. Auxiliary mounting attachment means adapted to be attached to a main glare shield of a vehicle sun visor means and adapted to positionally adjustably mount an auxiliary glare shield for controllably positionable adjustment with respect to said main glare shield, comprising: longitudinal positionally adjustable auxiliary glare shield mounting means including first and second portions, said first portion comprising longitudinal junction means provided with controllably engageable and disengageable attachment means cooperable for attachment thereof to a main glare shield along the length thereof said second portion including slidable engagement means normally in slidable engagement with said longitudinal junction means and provided with effective pivotal connection means and support means cooperable for mounting engagement with respect to an auxiliary glare shield in a manner for supporting it in outwardly projecting relationship with respect to said main glare shield, said slidable engagement means and said longitudinal junction means slidably engaged therewith including means for preventing relative rotation thereof around a longitudinal axis substantially coincident with said longitudinal junction means, one of said first and second portions of said adjustable mounting means comprising a longitudinal outwardly projecting track means lying in a plane having a component substantially normal to the surface of said main glare shield, and the other of said portions of said adjustable mounting means comprising encompassing track follower means normally relatively slidably positioned on said track means for relative longitudinal sliding movement.

References Cited
UNITED STATES PATENTS

| | | | |
|---|---|---|---|
| 2,894,576 | 7/1959 | Williams | 296—97 |
| 3,095,233 | 6/1963 | Dryden | 296—97 |
| 3,265,434 | 8/1966 | Bolotin | 296—97 |

BENJAMIN HERSH, *Primry Examiner.*

J. A. PEKAR, *Assistant Examiner.*